US006187846B1

United States Patent
Walters

(10) Patent No.: US 6,187,846 B1
(45) Date of Patent: Feb. 13, 2001

(54) THERMALLY STABILIZED, PIGMENTED, STEREOREGULAR, BRANCHED-MONO-1-OLEFIN POLYMER COMPOSITIONS

(75) Inventor: John P. Walters, Greer, SC (US)

(73) Assignee: Phillips Petroleum Company, Bartlesville, OK (US)

( * ) Notice: Under 35 U.S.C. 154(b), the term of this patent shall be extended for 0 days.

(21) Appl. No.: 08/143,415

(22) Filed: Oct. 26, 1993

(51) Int. Cl.$^7$ ................. C08K 5/34; C08K 5/09
(52) U.S. Cl. ............ 524/100; 524/193; 524/291
(58) Field of Search ................ 524/100, 193, 524/291

(56) References Cited

U.S. PATENT DOCUMENTS

| 3,244,650 | 4/1966 | Hecker et al. | 260/23 |
|---|---|---|---|
| 4,366,280 | 12/1982 | Yukawa | 524/291 |

OTHER PUBLICATIONS

PATCO Bulletin No. 603, Dec. 1985.

*Primary Examiner*—Kriellion Sanders
(74) *Attorney, Agent, or Firm*—Carl D. Corvin; Edward L. Bowman

(57) ABSTRACT

An additive composition is provided that comprises:
 (a) tris(3,5-di-tert-butyl-4-hydroxybenzyl)isocyanurate;
 (b) bis(2,4-di-tert-butylphenyl)pentaerythritol diphosphite; and
 (c) a costabilizer selected from the group consisting of sodium stearoyl lactylate, calcium stearoyl lactylate, calcium lactate, and mixtures thereof. Additionally, polymer compositions are provided that comprise the additive composition and (a) 2-Naphthalenecarboxamide, N,N'-(2-chloro-1,4 phenylene)bis[4-[(2,5-dichlorophenyl)azo]-3-hydroxy- and (b) a stereoregular, branched-mono-1-olefin polymer.

8 Claims, No Drawings

THERMALLY STABILIZED, PIGMENTED, STEREOREGULAR, BRANCHED-MONO-1-OLEFIN POLYMER COMPOSITIONS

BACKGROUND OF THE INVENTION

This invention is related to the field of pigmented, stereoregular, branched-mono-1-olefin polymer compositions.

It is known in the art that polymer compositions usually need to be stabilized against a variety of degradation processes. These degradation processes can render a polymer composition almost entirely useless. For example, polymer compositions usually need to be stabilized against thermal degradation because such degradation can tear apart the polymer chains as well as discolor the polymer composition. Pigmented, stereoregular, branched-mono-1-olefin polymer compositions (hereafter pigmented "SBM" polymer compositions) are especially susceptible to thermal degradation due to, in part, the particular polymerization processes used to produce these polymers, the molecular structure of these polymers, and the pigments used in these polymers.

It is also known in the art that certain compounds can usually be added to a polymer composition to stabilize a polymer composition against certain degradation processes. However, it is also known that this area of polymer science is a highly unpredictable area.

SUMMARY OF THE INVENTION

This invention provides an additive composition that has a combination of compounds that can improve a pigmented SBM polymer composition's resistance to thermal degradation. Furthermore, this invention provides a pigmented SBM polymer composition that has a combination of compounds that improves a pigmented SBM polymer composition's resistance to thermal degradation.

It is an object of this invention to provide an additive composition that improves the thermal resistance of pigmented SBM polymer compositions.

It is another object of this invention to provide pigmented SBM polymer compositions that have improved resistance to thermal degradation.

It is another object of this invention to provide a pigmented polypropylene homopolymer or copolymer composition that has an improved resistance to thermal degradation.

In accordance with this invention an additive composition is provided that comprises (or optionally consists essentially of, or consists of):

(a) tris(3,5-di-tert-butyl-4-hydroxybenzyl)isocyanurate;
(b) bis(2,4-di-tert-butylphenyl)pentaerythritol diphosphite; and
(c) a costabilizer selected from the group consisting of sodium stearoyl lactylate, calcium stearoyl lactylate, calcium lactate, and mixtures thereof.

In accordance with another embodiment of this invention polymer compositions are provided that comprise (or optionally consist essentially of, or consist of):

(a) tris(3,5-di-tert-butyl-4-hydroxybenzyl)isocyanurate;
(b) bis(2,4-di-tert-butylphenyl)pentaerythritol diphosphite;
(c) a costabilizer selected from the group consisting of sodium stearoyl lactylate, calcium stearoyl lactylate, calcium lactate, and mixtures thereof;
(d) 2-Naphthalenecarboxamide, N,N'-(2-chloro-1,4 phenylene)bis[4-[(2,5-dichlorophenyl)azo]-3-hydroxy-;
(e) a stereoregular, branched-mono-1-olefin polymer.

These and other objects, features, aspects, and advantages of this invention will become better understood with reference to the following description and claims.

DETAILED DESCRIPTION OF THE INVENTION

The SBM polymers that can be used in this invention are those polymers that have been formed by polymerization of branched mono-1-olefins. These branched-mono-1-olefins have the following structure.

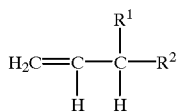

wherein $R^1$ is a hydrogen or a $C_nH_{(2n+1)}$ alkyl, where n is an integer from 1 to about 4; and wherein $R^2$ is hydrogen or a $C_xH_{(2x+1)}$ alkyl, where x is an integer from 1 to about 6. Examples of branched-mono-1-olefins useful in this invention are: propylene; 3-methyl-1-butene; 3-methyl-1-pentene; 4-methyl-1-pentene; and 3-ethyl-1-hexene. These branched-mono-1-olefins can be polymerized by any method in the art, thereby producing the SBM polymers useful in this invention. Each of these branched-mono-1-olefins could be polymerized alone to form a SBM homopolymer, or it could be polymerized with any of the other branched-mono-1-olefins to form a SBM copolymer. Additionally, a branched-mono-1-olefin could be polymerized with monomers such as ethylene, 1-butene, 1-pentene, 1-hexene, or mixtures thereof, to form a SBM-monomer copolymer. However, it is believed that the major portion of this SBM-monomer copolymer should be a branched-mono-1-olefin in order to retain the benefits of this invention. The term "major portion" for the purposes of this specification means greater than 50 mole percent based on the total number of moles of branched-mono-1-olefin and monomer present in the SBM-monomer copolymer.

The additive composition of this invention comprises: (a) tris(3,5-di-tert-butyl-4-hydroxybenzyl)isocyanurate; (b) bis (2,4-di-tert-butylphenyl)pentaerythritol diphosphite; (c) a costabilizer selected from the group consisting of sodium stearoyl lactylate, calcium stearoyl lactylate, calcium lactate, and mixtures thereof. The components of this composition can be further described as follows.

Tris(3,5-di-tert-butyl-4-hydroxybenzyl)isocyanurate also known as 1,3,5-tris(3,5-di-tert-butyl-4-hydroxybenzyl)-s-triazine 2,4,6 (1H,3H, 5H)trione is commercially available from the Ciba-Geigy Corporation as Irganox 3114. Bis(2,4-di-tert-butylphenyl)pentaerythritol diphosphite is commercially available from the General Electric Corporation as Ultranox 626. Sodium stearoyl lactylate, calcium stearoyl lactylate, and calcium lactate is available from the C.J. Patterson Company as Pationic 920, 940, 1230 and 1240.

The sodium stearoyl lactylate used in this invention has an acidic ph (i.e. a ph below about 7). The calcium stearoyl lactylate used in this invention has a basic ph (i.e. a ph above about 7). The calcium lactate composition used in the invention has a neutral to basic ph (i.e. a ph about or above 7).

The amount of each additive to use in the additive composition is generally in the range of about 1 weight percent to about 98 weight percent based on the total weight of the additive composition. However, it is preferred that the amounts used by "substantially equal" for best results. The term "substantially equal" means for the purposes of this specification that the weight ratio of any one component to another component is within the range of about 0.5 to about 2. For example, an additive composition could have 5 parts by weight Irganox 3114, 10 parts by weight Ultranox 626, and 10 parts by weight Pationic 1230.

The amount of each additive to use in the SBM polymer composition is generally in the range of about 0.001 weight percent to about 5 weight percent based on the weight of the entire composition. However, it is preferred that the amount of each additive is in the range of about 0.005 to about 3 weight percent; and most preferably the amount of each additive is in the range of 0.01 to 1 weight percent. Generally, the total amount of additives to add to the SBM polymer is not greater than about 5 weight percent based on the weight of the entire composition. However, amounts as low as about 0.01 weight percent may be used. If too little of these additives are added to the SBM polymer to form the SBM polymer composition, the SBM polymer composition might not obtain the full benefits of this invention. Furthermore, adding too much of the additives can be expensive and can adversely affect the other properties of the SBM polymer composition.

2-Naphthalenecarboxamide, N,N'-(2-chloro-1,4 phenylene)bis[4-[(2,5- dichlorophenyl)azo]-3-hydroxy-, (CA Index name) also known as, 2-Naphthamide, N,N'-(2-chloro-p-phenylene)bis[4-[(2,5-dichlorophenyl)azo]-3-hydroxy-, (another CA Index name) is bluish red pigment. It is commonly known as C.I. 20735 and C.I. Pigment Red 144. The chemical structure is as follows.

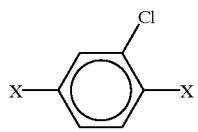

where X=

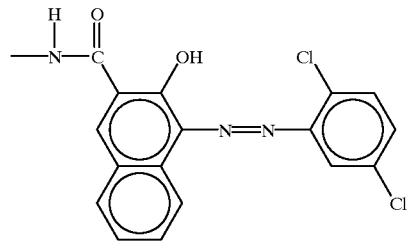

The amount to use of C.I. Pigment Red 144 is from about 0.0001 to about 5 weight percent based on the weight of the entire composition (SBM polymer, pigment, and additives). However, it is preferred that the amount used is from about 0.005 to about 3 weight percent; and it is most preferred if the amount used is from about 0.01 to about 1 weight percent. If too little pigment is used the SBM polymer will not be sufficiently pigmented. If too much pigment is used the properties of the SBM polymer could be adversely affected.

Other additives optionally can be incorporated into the SBM polymer composition. Examples are antifogging agents, antimicrobial agents, antioxidants, colorants, coupling agents, flame retardants, foaming agents, fragrances, lubricants, mold release agents, organic peroxides, plasticizers, smoke suppressants, heat stabilizers, ultraviolet light stabilizers, fibrous reinforcements, fillers, nickel stabilizers, antistatic agents, and mixtures of two or more of these additives. Further information on these additives can be found on pages 143–220 of the Modern Plastics Encyclopedia '92.

The additive composition can be produced by blending together the individual compounds. In the alternative, each of the above additive compounds can be blended with the SBM polymer to form the SBM polymer composition. These compounds can be blended together in any manner known in the art. For example, the components of the SBM polymer composition can be combined by dry mixing in the form of a powder or wet mixing in the form of a solution or slurry. In these types of methods, the SBM polymer can be in any form such as fluff, powder, granulate, pellet, solution, slurry, or emulsion.

EXAMPLE

This example is provided to assist a person with ordinary skill in the art with understanding this invention. This example is intended to be illustrative of the invention and is not meant to be construed as limiting the scope of the invention.

Besides C.I. Pigment Red 144 (hereafter "R144") the following pigments were used in this example.

[1] C.I. Pigment Yellow 83 (hereafter "Y83")

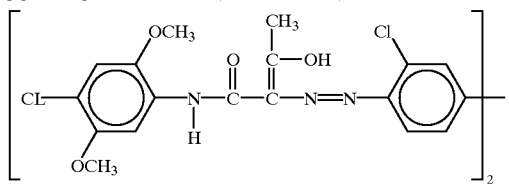

[2] C.I. Pigment Violet 19 (hereafter "V19")

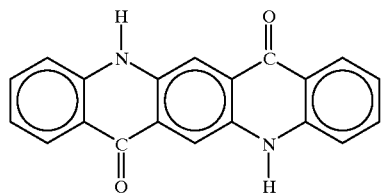

[3] C.I. Pigment Blue 15 (hereafter "B15")

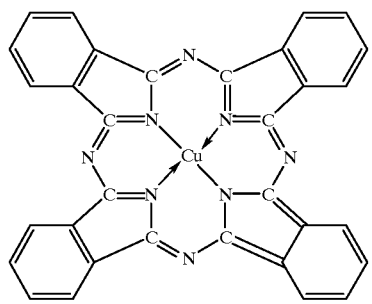

Other compounds used in this example are.

[1] Sodium stearoyl lactylate, Pationic 920 (hereafter "P920"), ph of about 5.5.

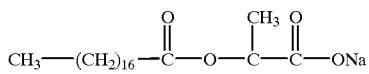

[2] Pationic 925, (hereafter "P925") a mixture of sodium stearoyl lactylate and calcium stearoyl lactylate with a ph of about 5.5.
[3] Calcium stearoyl lactylate, Pationic 930 (hereafter "P930") ph of 5.5.

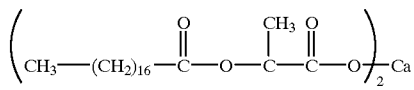

[4] Calcium stearoyl lactylate, Pationic 940 (hereafter "P940") ph of about 9.5.
[5] Calcium lactate, Pationic 1230 (hereafter "P1230") ph of about 7.

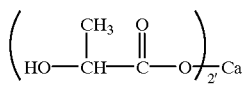

[6] Calcium lactate, Pationic 1240 (hereafter "P1240") ph of about 9.5.
[7] Zinc lactate, Pationic 1264 (hereafter "P1264") ph of about 5.5.

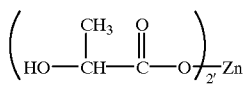

Polypropylene homopolymer was used as a base resin in this example. It had a melt flow of about 8 grams per 10 minutes and a density of about 0.9 grams per cubic centimeter. Additionally it contained the following compounds (weight percents based on the weight of the polypropylene resin)

[1] 0.075 weight percent of tris(3,5-di-tert-butyl-4-hydroxybenzyl) isocyanurate;
[2] 0.075 weight percent of bis(2,4-di-tert-butylphenyl) pentaerythritol diphosphite;
[3] 0.0375 weight percent of Chimassorb 944FL, also known as, Poly[[6-[(1,1,3,3-tetramethylbutyl)amino]-s-triazine-2,4-diyl][2,2,6,6-tetramethyl-4-piperidyl)imino]hexamethylene-[(2,2,6,6-tetramethyl-4-piperidyl)-imino]] which is available from the Ciba-Geigy Corporation.
[4] 0.05 weight percent of zinc stearate.

Part One

In part one the melt flow of the base resin was tested for melt flow degradation. The base resin was blended with the indicated components in a 1.25 inch extruder. The temperature of the extruder was about 220 degrees Celsius and the residence time was one minute. This blending step was done twice to thoroughly blend the components. After blending the blended resin was passed through a one inch extruder at the indicated temperature. The residence time was five minutes. The resin was then pump through a 34 hole die (spinnerette) to form an eight denier fiber. The results are recorded in table one.

TABLE ONE

| Run | P940[1] | Y83[2] | V19[a] | R144[4] | B15[5] | Temperature °C.[6] | | | |
|---|---|---|---|---|---|---|---|---|---|
| | | | | | | 260 | 274 | 288 | 316 |
| 1 | 0 | 0 | 0 | 0 | 0 | 9.1 | — | — | — |
| 2 | 0 | 0 | 0 | 0 | 0 | — | 16.2 | — | — |
| 3 | 0 | 0 | 0 | 0 | 0 | — | — | 14.5 | — |
| 4 | 0 | 0 | 0 | 0 | 0 | — | — | — | 27.8 |
| 5 | 0 | 3 | 0 | 0 | 0 | 10.2 | — | — | — |
| 6 | 0 | 3 | 0 | 0 | 0 | — | 12.2 | — | — |
| 7 | 0 | 3 | 0 | 0 | 0 | — | — | 78.7 | — |
| 8 | 0.10 | 3 | 0 | 0 | 0 | 9.6 | — | — | — |
| 9 | 0.10 | 3 | 0 | 0 | 0 | — | 10.1 | — | — |
| 10 | 0.10 | 3 | 0 | 0 | 0 | — | — | 87.6 | — |
| 11 | 0 | 0 | 3 | 0 | 0 | 9.2 | — | — | — |
| 12 | 0 | 0 | 3 | 0 | 0 | — | 10.4 | — | — |
| 13 | 0 | 0 | 3 | 0 | 0 | — | — | 11.6 | — |
| 14 | 0 | 0 | 3 | 0 | 0 | — | — | — | 20.8 |
| 15 | 0.10 | 0 | 3 | 0 | 0 | 8.8 | — | — | — |
| 16 | 0.10 | 0 | 3 | 0 | 0 | — | 13.9 | — | — |
| 17 | 0.10 | 0 | 3 | 0 | 0 | — | — | 11.7 | — |
| 18 | 0.10 | 0 | 3 | 0 | 0 | — | — | — | 21.4 |
| 19 | 0 | 0 | 0 | 3 | 0 | 10.3 | — | — | — |
| 20 | 0 | 0 | 0 | 3 | 0 | — | 11.8 | — | — |
| 21 | 0 | 0 | 0 | 3 | 0 | — | — | 21.8 | — |
| 22 | 0 | 0 | 0 | 3 | 0 | — | — | — | 31.9 |
| 23 | 0.10 | 0 | 0 | 3 | 0 | 9.6 | — | — | — |
| 24 | 0.10 | 0 | 0 | 3 | 0 | — | 11.8 | — | — |
| 25 | 0.10 | 0 | 0 | 3 | 0 | — | — | 14.3 | — |
| 26 | 0.10 | 0 | 0 | 3 | 0 | — | — | — | 18.0 |
| 27 | 0 | 0 | 0 | 0 | 3 | 10.0 | — | — | — |
| 28 | 0 | 0 | 0 | 0 | 3 | — | 13.6 | — | — |
| 29 | 0 | 0 | 0 | 0 | 3 | — | — | 21.2 | — |
| 30 | 0 | 0 | 0 | 0 | 3 | — | — | — | 32.2 |
| 31 | 0.10 | 0 | 0 | 0 | 3 | 11.3 | — | — | — |
| 32 | 0.10 | 0 | 0 | 0 | 3 | — | 12.6 | — | — |
| 33 | 0.10 | 0 | 0 | 0 | 3 | — | — | 21.4 | — |
| 34 | 0.10 | 0 | 0 | 0 | 3 | — | — | — | 27.1 |

[1]This is the weight percent based on the total weight of the sample (resin, P940, and pigment)
[2-5]This is the weight percent based on the total weight of the sample (resin, P940, and pigment). Each pigment was in a polymer carrier (25 weight percent pigment/75 weight percent carrier.
[6]The indicated value is the melt flow of the fiber measured in accordance with ASTMD-1238-82 Condition L.

It can be observed from runs 1–22 and runs 27–34 that other pigments are not stabilized by P940. However, it is apparent that P940 works in conjunction with Irganox 3114 and Ultranox 626 to help thermally stabilize R144.

Part Two

In part two the melt flow of the base resin was tested for melt flow degradation. This was done in accordance with the procedure in part one. The results are recorded in table two.

TABLE TWO

| | P Compounds | | | | | | | Temperature °C. | | | |
|---|---|---|---|---|---|---|---|---|---|---|---|
| Run | P920[1] | P925[1] | P930[1] | P940[1] | P1230[1] | P1240[1] | P1264[1] | 260 | 274 | 288 | 316 |
| 1 | 0 | 0 | 0 | 0 | 0 | 0 | 0 | 12.3 | — | — | — |
| 2 | 0 | 0 | 0 | 0 | 0 | 0 | 0 | — | 14.8 | — | — |
| 3 | 0 | 0 | 0 | 0 | 0 | 0 | 0 | — | — | 22.6 | — |
| 4 | 0 | 0 | 0 | 0 | 0 | 0 | 0 | — | — | — | 43.3 |
| 5 | 0.10 | 0 | 0 | 0 | 0 | 0 | 0 | 11.5 | — | — | — |
| 6 | 0.10 | 0 | 0 | 0 | 0 | 0 | 0 | — | 13.0 | — | — |
| 7 | 0.10 | 0 | 0 | 0 | 0 | 0 | 0 | — | — | 15.8 | — |
| 8 | 0.10 | 0 | 0 | 0 | 0 | 0 | 0 | — | — | — | 16.4 |
| 9 | 0 | 0.10 | 0 | 0 | 0 | 0 | 0 | 11.5 | — | — | — |
| 10 | 0 | 0.10 | 0 | 0 | 0 | 0 | 0 | — | 14.5 | — | — |
| 11 | 0 | 0.10 | 0 | 0 | 0 | 0 | 0 | — | — | 21.9 | — |
| 12 | 0 | 0.10 | 0 | 0 | 0 | 0 | 0 | — | — | — | 38.2 |
| 13 | 0 | 0 | 0.10 | 0 | 0 | 0 | 0 | 11.8 | — | — | — |
| 14 | 0 | 0 | 0.10 | 0 | 0 | 0 | 0 | — | 15.2 | — | — |
| 15 | 0 | 0 | 0.10 | 0 | 0 | 0 | 0 | — | — | 22.7 | — |
| 16 | 0 | 0 | 0.10 | 0 | 0 | 0 | 0 | — | — | — | 42.0 |
| 17 | 0 | 0 | 0 | 0.10 | 0 | 0 | 0 | 11.0 | — | — | — |
| 18 | 0 | 0 | 0 | 0.10 | 0 | 0 | 0 | — | 13.0 | — | — |
| 19 | 0 | 0 | 0 | 0.10 | 0 | 0 | 0 | — | — | 16.0 | — |
| 20 | 0 | 0 | 0 | 0.10 | 0 | 0 | 0 | — | — | — | 25.0 |
| 21 | 0 | 0 | 0 | 0 | 0.10 | 0 | 0 | 10.6 | — | — | — |
| 22 | 0 | 0 | 0 | 0 | 0.10 | 0 | 0 | — | 12.3 | — | — |
| 23 | 0 | 0 | 0 | 0 | 0.10 | 0 | 0 | — | — | 14.0 | — |
| 24 | 0 | 0 | 0 | 0 | 0.10 | 0 | 0 | — | — | — | 28.6 |
| 25 | 0 | 0 | 0 | 0 | 0 | 0.10 | 0 | 10.4 | — | — | — |
| 26 | 0 | 0 | 0 | 0 | 0 | 0.10 | 0 | — | 11.4 | — | — |
| 27 | 0 | 0 | 0 | 0 | 0 | 0.10 | 0 | — | — | 12.8 | — |
| 28 | 0 | 0 | 0 | 0 | 0 | 0.10 | 0 | — | — | — | 18.4 |
| 29 | 0 | 0 | 0 | 0 | 0 | 0 | 0.10 | 11.4 | — | — | — |
| 30 | 0 | 0 | 0 | 0 | 0 | 0 | 0.10 | — | 14.7 | — | — |
| 31 | 0 | 0 | 0 | 0 | 0 | 0 | 0.10 | — | — | 20.7 | — |
| 32 | 0 | 0 | 0 | 0 | 0 | 0 | 0.10 | — | — | — | 37.6 |

[1]Each sample contained R144 pigment. The amount of R144 pigment used was 3 weight percent (25 weight percent R144/75 weight percent carrier). The weight percents of the pigment and the Pationic compounds are based on the total weight of the sample (resin + R144 + Pationic compounds).

It can be observed from runs 4–8 and 17–28 that P920, P940, P1230, and P1240 stabilized the pigmented resin the best. However, it is apparent that P925, P930, and P1264 did not stabilize the pigmented resin enough.

That which is claimed is:

1. A pigmented, stereoregular, branched-mono-1-olefin polymer composition comprising:
   (a) tris(3,5-di-tert-butyl-4-hydroxybenzyl)isocyanurate;
   (b) bis(2,4-di-tert-butylphenyl)pentaerythritol diphosphite;
   (c) a costabilizer selected from the group consisting of sodium stearoyl lactylate, calcium stearoyl lactylate, calcium lactate, and mixtures thereof;
   (d) 2-Naphthalenecarboxamide, N,N'-(2-chloro-1,4 phenylene)bis[4-[(2,5-dichlorophenyl)azo]-3-hydroxy-;
   (e) a stereoregular, branched-mono-1-olefin polymer.

2. A composition according to claim 1 wherein the amount of components (a), (b), (c), and (d) is from about 0.005 to about 3 weight percent based on the weight of components (a), (b), (c), (d), and (e).

3. A composition according to claim 1 wherein said branched mono-1-olefin has the formula:

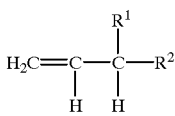

wherein $R^1$ is hydrogen or a $C_nH_{(2n+1)}$ alkyl, where n is an integer from 1 to about 4; and wherein $R^2$ is a hydrogen or a $C_xH_{(2x+1)}$ alkyl, where x is an integer from 1 to about 6.

4. A composition according to claim 1 wherein said branched mono-1-olefin is propylene, 3-methyl-1-butene, 3-methyl-1-pentene, 4-methyl-1-pentene, 3-ethyl-1-hexene, and mixtures of two or more said branched-mono-1-olefins.

5. A composition according to claim 1 wherein said branched mono-1-olefin is propylene.

6. A composition according to claim 1 wherein said branched-mono-1-olefin is 4-methyl-1-pentene.

7. A composition according to claim 1 wherein said stereoregular, branched-mono-1-olefin polymer is a copolymer.

8. A composition according to claim 7 wherein said copolymer comprises a major amount of propylene and a minor amount of another mono-1-olefin.

* * * * *